US008849844B1

(12) United States Patent
Brewington

(10) Patent No.: US 8,849,844 B1
(45) Date of Patent: *Sep. 30, 2014

(54) IMAGE REACQUISITION

(71) Applicant: Google Inc., Mountain View, CA (US)

(72) Inventor: Brian Edmond Brewington, Fort Collins, CO (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/073,303

(22) Filed: Nov. 6, 2013

Related U.S. Application Data

(63) Continuation of application No. 13/082,898, filed on Apr. 8, 2011, now Pat. No. 8,612,465.

(51) Int. Cl.
*G06F 17/30* (2006.01)
(52) U.S. Cl.
USPC .......................................... 707/759; 707/769
(58) Field of Classification Search
USPC .................................................. 707/759, 769
See application file for complete search history.

(56) References Cited

U.S. PATENT DOCUMENTS

| 6,609,128 | B1 * | 8/2003 | Underwood | 707/610 |
|---|---|---|---|---|
| 8,463,487 | B2 * | 6/2013 | Nielsen et al. | 701/31.4 |
| 8,473,148 | B2 * | 6/2013 | Nielsen et al. | 701/31.4 |
| 2001/0038718 | A1 | 11/2001 | Kumar et al. | |
| 2005/0195096 | A1 * | 9/2005 | Ward et al. | |
| 2010/0332513 | A1 * | 12/2010 | Azar et al. | 707/769 |
| 2011/0082846 | A1 * | 4/2011 | Bamba et al. | 707/702 |
| 2012/0086725 | A1 * | 4/2012 | Joseph et al. | 345/629 |
| 2013/0132366 | A1 * | 5/2013 | Pieper | 707/710 |
| 2013/0174072 | A9 * | 7/2013 | Nielsen et al. | 715/771 |

OTHER PUBLICATIONS

Brian E. Brewington, Observation of Changing Information Sources, Jun. 2000, 156 pages, retrieved from the Internet: <http://agent.cs.dartmouth.edu/papers/brewington:thesis.pdf>.
P. Coppin, I. Jonckheere, K. Nackaerts, B. Muys and E. Lambin, Digital Change Detection Methods in Ecosystem Monitoring: A Review, May 10, 2004, 32 pages.

* cited by examiner

*Primary Examiner* — Kim Nguyen
(74) *Attorney, Agent, or Firm* — Lerner, David, Littenberg, Krumholz & Mentlik, LLP

(57) ABSTRACT

Observation bandwidth is allocated to an image provider such that an image may be reacquired while optimizing the utility of the image provider's observations. The observation bandwidth is allocated with reference to the rate of change associated with a location where images are acquired by the image provider and to an importance value associated with the location. The rate of change identifies how frequently the location is subject to modifications. The importance value indicates a likelihood that users are concerned with receiving current image data at the location. Different locations having substantially the same rate of change and importance value are grouped together. The same observation bandwidth is allocated for the image providers at locations that are grouped together such that each image provider may reacquire images at the allocated observation bandwidth.

20 Claims, 4 Drawing Sheets

IMAGE REACQUISITION

CROSS-REFERENCE TO RELATED APPLICATIONS

The present application is a continuation of U.S. patent application Ser. No. 13/082,898, filed on Apr. 8, 2011, the disclosure of which is incorporated herein by reference.

BACKGROUND OF THE INVENTION

Various network-based search applications allow a user to enter search terms and receive a list of search results from different information sources. The content of the results may change over time such that the information, such as images, provided in response to the search may not be current. For example, an image provider may provide landscape images. As the landscape changes over time, for example where a dilapidated building leveled, a retail establishment closes, a new home is constructed on a previously vacant lot, or other variations occur due to seasonal or daylight changes (e.g., summer vs. winter, day vs. night), at least some of the previously captured images will become stale because the landscape images may not reflect a current version of the location. If the imagery corresponding to these locations is not updated to reflect the changes, then users may be provided with stale or out of date images for the location.

In another example, an image provider may provide areal images of a location. As the landscape of the area changes over time, at least some of the captured images may become stale. For example, trees may have been cleared as a precursor to construction of a new road. Accordingly, any images that include these trees may be considered stale and any images that show the cleared area but not the new road may soon become stale. If the images that correspond to these locations are not updated to reflect the changed landscape, then stale images may be provided in response to a request for these images.

A determination of whether an information source is current may depend upon how frequently the information sources are updated. However, continuously observing any potential information sources to detect changes in content is an inefficient use of bandwidth resources since some information sources change frequently while other information sources are rarely modified. Further, as up-to-date information may be of greater value of many sources, it may also be inefficient to allocate bandwidth to refresh information sources which are known to be dated.

BRIEF SUMMARY OF THE INVENTION

Aspects of the invention relate generally to efficient acquisition of imagery requested from various sources. In particular, aspects of the invention relate to avoiding expending time and computing resources to obtain imagery from image sources which may be slow to update imagery or considered to be of lower importance. In one example, the observation bandwidth allocation of a source or provider of images may be reacquired while optimizing the utility of the image provider's observations. The image observation bandwidth may be defined as the total amount of resources expended gathering new images. Image providers may continually acquire images such that stale images may be replaced with current images on a regular basis. The images captured at some locations may become outdated at a faster rate than images acquired at other locations. Observation bandwidth may be allocated such that an image provider may be more likely to capture current images to replace corresponding stale images and to reacquire images that are frequently accessed by users. Similarly, observation bandwidth may be allocated such that an image provider may be less likely to capture images that have not been modified since the previous image acquisition or to reacquire images that are not commonly accessed by users.

The observation bandwidth of an image provider may be allocated based on the rate of change associated with a location corresponding to images acquired by the image provider. The rate of change may identify how frequently the location captured by the image provider may be subject to modifications (how quickly the images captured by a particular image provider become stale).

The observation bandwidth of an image provider may also be based on an importance value associated with a locations corresponding to images acquired by the image provider. The importance value may indicate a likelihood that users are concerned with receiving current image data for the location. For example, the importance value may be based on the aggregate user benefit of having up-to-date or fresh imagery at a location or a negative penalty for having stale imagery at a location.

The locations that have substantially the same rate of change and importance value may be grouped together. Based upon these groupings, the same observation bandwidth may be re-allocated to optimize the utility of the bandwidth expended at each location. The re-allocated observation bandwidth for each grouping may then be used to reacquire images for the image providers of the grouping. Thus, the importance value and rate of change for a particular location and image provider as compared to other locations and image providers may be used to identify the amount of resources allocated to updating the images obtained from the particular image provider.

One aspect of the invention provides a computer-implemented method. The method includes receiving image data and estimating a rate of change for a location using a processor. The rate of change identifies a frequency at which the location is modified. The method further includes determining an importance value associated with the location using the processor. The importance value indicates a likelihood that the image data collected from the location is current. The observation bandwidth is determined, by a processor, to an image provider at the location based on the estimated rate of change and the determined importance value. The observation bandwidth identifies a rate at which the image provider reacquires image data at the location.

In one example, determining the observation bandwidth includes grouping a plurality of locations that have substantially the same estimated rate of change and substantially the same determined importance value, accessing a plurality of image providers each associated with a location, and determining the same observation bandwidth for each image provider associated with locations in the same group. In another example, the method also includes reacquiring the image data at the location based on the observation bandwidth allocated to the image provider at the location. In yet another example, determining observation bandwidth includes, in the event that the importance value indicates an expectation that the image data collected from the location is current, determining the observation bandwidth for the image provider at the location that is higher than the corresponding rate of change of the location. In still another example, determining observation bandwidth includes, in the event that the importance value indicates no expectation that the image data collected from the location is current, determining the observation bandwidth for the image provider at the location that is lower than the corresponding rate of change of the location.

In a further example, estimating the rate of change for the location includes accessing image data previously collected at the location and identifying a frequency with which the accessed image data changes. In still a further example, estimating the rate of change for the location includes receiving input regarding a modification to the location and identifying a frequency with which the input is received.

In another example, determining the importance value associated with the location includes receiving input from users regarding a modification to the location and identifying a number of users from which the input is received. In yet another example, determining the importance value associated with the location comprises identifying a number of times that the location is received as a navigational point. In yet a further example, determining the importance value associated with the location comprises identifying a number of advertisers associated with the location. In another example, the image provider is associated with a search entity, and determining the importance value associated with the location comprises identifying a number of users that interact with the search entity at the location. In a further example, determining the importance value associated with the location includes identifying a combination of importance values associated with the location and determining the importance value based on the identified combination.

In another example, the image data includes at least one of an image, a location identifier, and a timestamp. In yet another example, the change is based on a time of day.

Another aspect of the invention provides a computer-implemented method for reacquiring images. The method includes receiving images for a plurality of locations. For each location of the plurality of locations the method includes identifying a rate of change for a location using a processor. The rate of change identifies a frequency at which the location is modified. For each location of the plurality of locations the method also includes determining an importance value associated with the location using the processor. The importance value indicates a likelihood that the image data collected from the location is current. The method also includes grouping, by the processor, one or more sets of locations of the plurality of locations that have substantially the same identified rate of change and substantially the same determined importance value, allocating, by the processor, a same observation bandwidth to image providers associated with locations in the same set, wherein the observation bandwidth is allocated using the processor, and reacquiring images using the image providers at a rate identified by the corresponding allocated observation bandwidth.

In one example, allocating observation bandwidth includes, in the event that the importance value indicates a likelihood that the images acquired from a location are current, allocating an observation bandwidth to the image providers at the location that is higher than the corresponding rate of change of the location. In another example, allocating observation bandwidth includes, in the event that the importance value indicates no expectation that the images collected from the location are current, allocating an observation bandwidth to the image providers at the location that is lower than the corresponding rate of change of the location.

In yet another example, identifying the rate of change for the location includes accessing images previously collected at the location and identifying a frequency with which the accessed images change. In a further example, identifying the rate of change for the location includes receiving input regarding a modification to the location and identifying a frequency with which the input is received.

In still a further example, determining the importance value associated with the location includes receiving input from users regarding a modification to the location and identifying a number of users from which the input is received. In yet another example, determining the importance value associated with the location comprises identifying a number of times that the location is received as a navigational point. In still another example, determining the importance value associated with the location comprises identifying a number of advertisers associated with the location.

In another example, the image provider is associated with a search entity, and determining the importance value associated with the location comprises identifying a number of users that interact with the search entity at the location. In a further example, the importance value is based on whether an image of the location includes text information.

Yet another aspect of the invention provides processor means that receives image data, estimates a rate of change for a location wherein the rate of change identifies a frequency at which the location is modified, and determines an importance value associated with the location. The importance value indicates an expectation that the image data collected from the location is current. The processor means also allocates observation bandwidth to an image provider at the location based on the estimated rate of change and the determined importance value. The observation bandwidth identifying a rate at which the image provider reacquires image data at the location.

In one example, allocating the observation bandwidth is based upon grouping a plurality of locations that have substantially the same estimated rate of change and substantially the same determined importance value and allocating the same observation bandwidth to image providers associated with locations in the same group.

DETAILED DESCRIPTION

Observation bandwidth of an image provider is allocated such that an image may be reacquired while optimizing the utility of the image provider's observations. Specifically, observation bandwidth is allocated such that newly acquired imagery is more likely where existing imagery has gone stale and fresh imagery is of higher value to users. Similarly, observation bandwidth may be allocated such that an image provider is less likely to capture images that have not been modified since a previous image acquisition or to reacquire images that are not commonly accessed by users.

Figure 1:
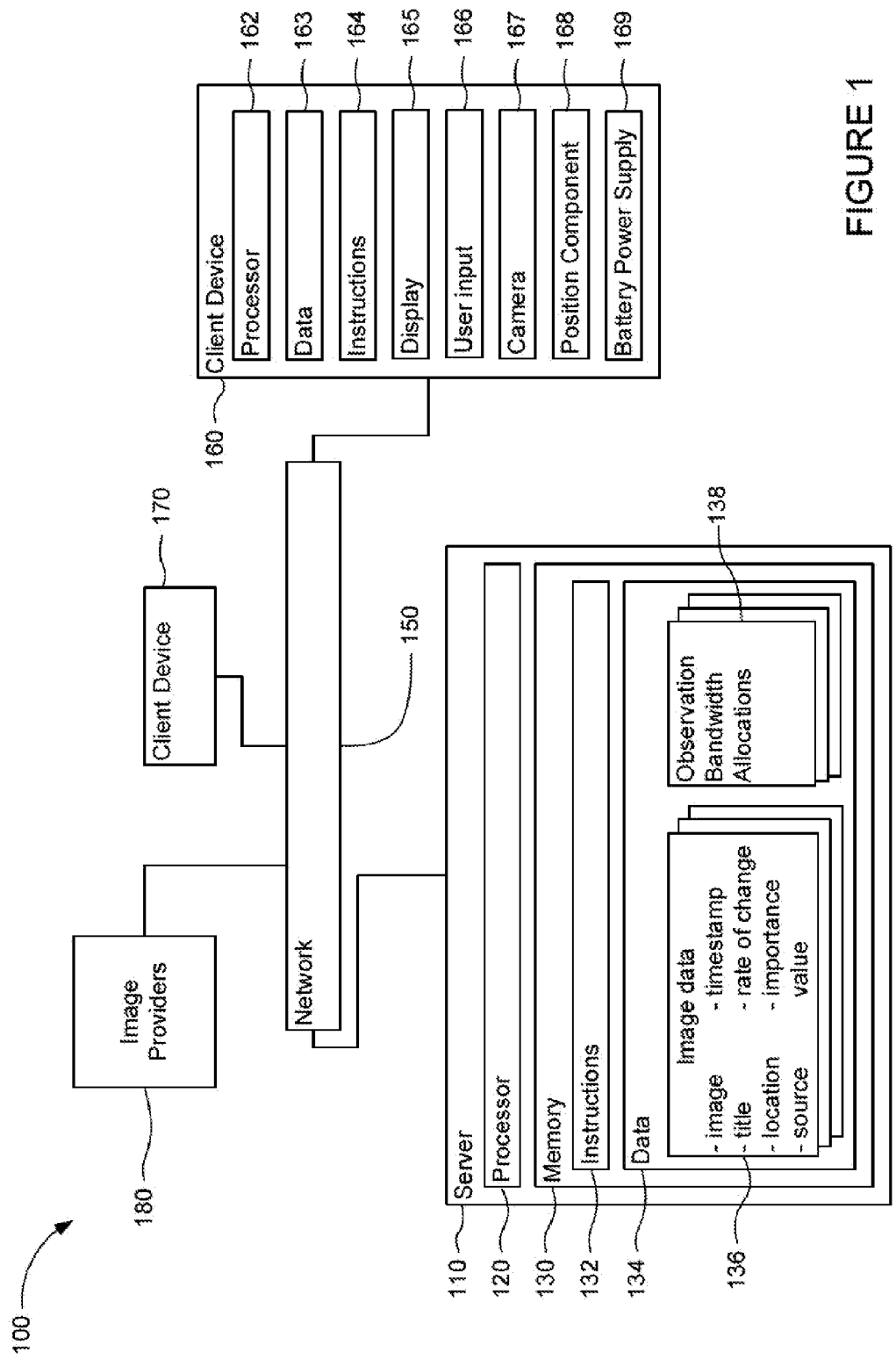
FIG. 1 is a functional diagram of a system in accordance with an aspect of the invention.
Figure 2:
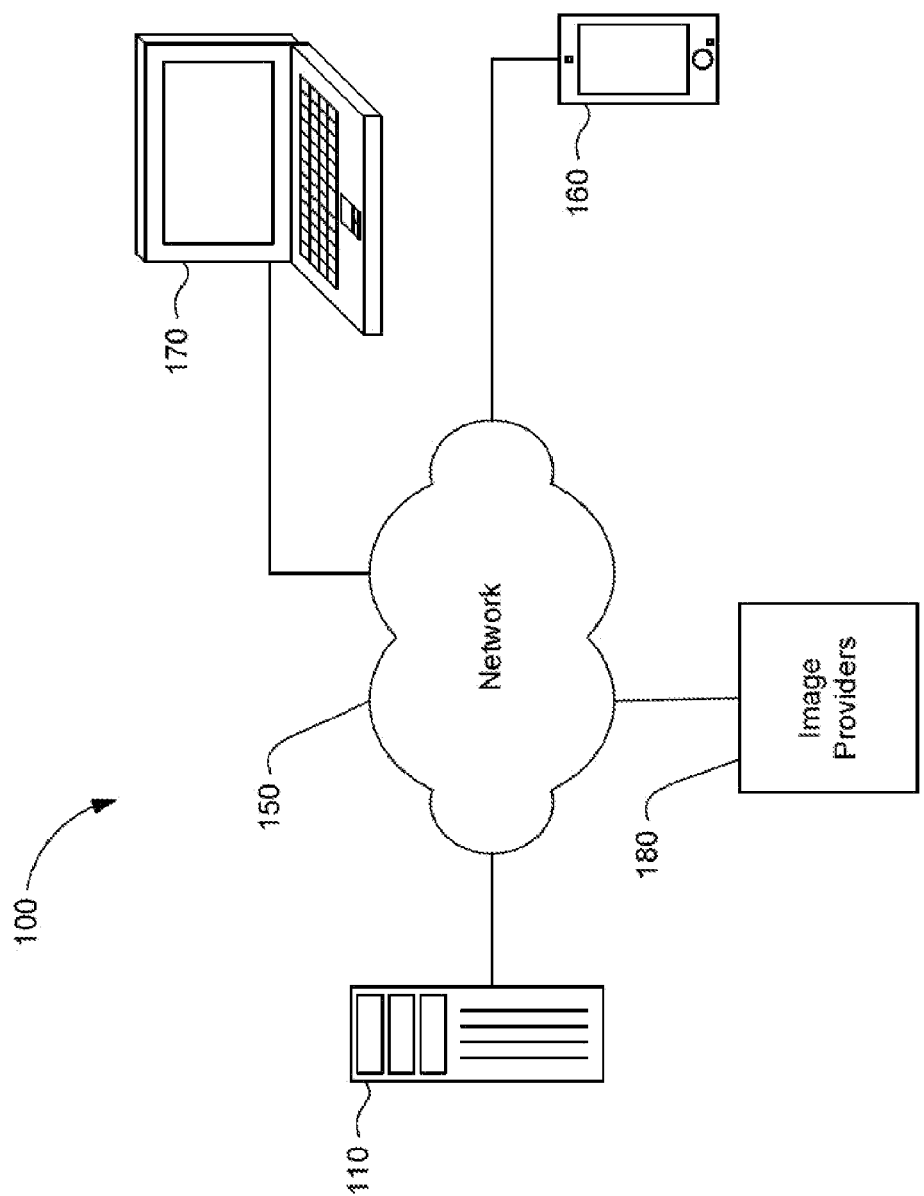
FIG. 2 is a pictorial diagram of the system of FIG. 1.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. The data 134 may include image data 136 that may be stored as bitmaps comprised of grids of pixels that are stored in accordance with formats that are compressed or uncompressed, lossless or lossy, and bitmap or vector-based, as well as computer instructions for drawing graphics. The data 134 may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor 120 may be a dedicated controller such as an ASIC. Although FIG. 1 functionally illustrates the processor 120 and memory 130 as being within the same block, it will be understood by those of ordinary skill in the art that the processor 120 and memory 130 may actually comprise multiple processors and memories that may or may not be stored within the same physical housing. For example, memory 130 may be a hard drive or other storage media located in a server farm of a data center. Accordingly, references to a processor, a computer or a memory will be understood to include references to a collection of processors or computers or memories that may or may not operate in parallel.

The computer 110 may be at one node of a network 150 and capable of directly and indirectly receiving data from other nodes of the network. For example, computer 110 may comprise a web server that is capable of receiving data from client devices 160, 170 and image sources or providers 180 via network 150 such that server 110 uses network 150 to transmit and display information to a user on display 165 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions as described above. Each client device 160 or 170 may be a personal computer intended for use by a person, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), and user input 166 (e.g., a mouse, keyboard, touch-screen or microphone). The client device may also include a camera 167, geographical position component 168, accelerometer, speakers, a network interface device, a battery power supply 169 or other power source, and all of the components used for connecting these elements to one another.

The geographical position component 168 may be used to determine the geographic location and orientation of the client device 160. For example, client device 160 may include a GPS receiver to determine the device's latitude, longitude and altitude. Thus, as the client device 160 changes locations, for example by being physically moved, the GPS receiver may determine a new current location. The component 168 may also comprise software for determining the position of the device based on other signals received at the client device 160, such as signals received at a cellular phone's antennas from one or more cellular phone towers if the client device is a cellular phone.

Although the client devices 160 and 170 may each comprise a full-sized personal computer, they may alternatively comprise mobile devices capable of wirelessly exchanging data, including position information derived from position component 168, with a server over a network such as the Internet. By way of example only, client device 160 may be a wireless-enabled PDA, a cellular phone, a netbook or a tablet PC capable of obtaining information via the Internet or other network. The user may input information using a small keyboard, a keypad or a touch screen.

Server 110 may have access to image data 136. The image data 136 may be obtained using a variety of different image providers 180 (see FIG. 2) that are also linked to the network 150. In one example, the image data may be images collected at street level using vehicles equipped with cameras. In another example, the image data may be images collected from an aerial position using airplanes or satellite imagery. In still another example, the image data may be images may be collected from a store of images that acts as a repository of images collected by known means.

The image data 136 may include data that provides an actual image (e.g., a bitmap) as well as other types of ancillary data. For example, the image may be associated with ancillary data that identifies a title of the image, a location where the image was captured by an image provider, and the image provider that captured the image.

The ancillary data may also include a timestamp that identifies when the image was captured, as well as other types of data. In some examples, the timestamp may be used to identify if the image is the most recent image acquired from a specific location or if the image is stale due to subsequent modifications made at the location.

The ancillary information may also identify the location that corresponds to the image using an address or some other location identifier such as a "geocode" (geospatial entity object code). A geocode is a numerical representation for geospatial coordinate measurements that provide details of the exact location of a geospatial point.

The ancillary may include data that identifies a rate of change of the location where the image was captured. The rate of change may identify how frequently the location is subject to modification. Thus, the rate of change may be the number of changes (however defined) per unit of time. For example, the definition of change may include "a new business appearing." In this example, a time sequence of business listings at a particular address may include:
t=0: business A is at 123 Main St
t=1: business A is at 123 Main St
t=2: business A is at 123 Main St
t=3: business B is at 123 Main St
t=4: business B is at 123 Main St
t=5: business B is at 123 Main St
t=6: business B is at 123 Main St
t=7: business B is at 123 Main St
t=8: business B is at 123 Main St
The above example may be modeled as a Bernoulli process: at any given time transition, there may be a fixed probability that the business at that address will change. It will be understood that a change may also be from "no business" to "business x". Assuming there is a spatial correlation between these probabilities, if there is a similar history for 124 Main St., the probability of a business change there is well-modeled by the change rate at 123 Main St. In this example, there are 8 observations and 1 change. For this location, the rate of change may be estimated as 0.125 changes per time unit.

Once many such observations are made in a particular location, a function that estimates the probability of change for any location p_0 in the area may be constructed using a mixture model. For example, one such model may be a weighted average of "influences" from the various samples:
$\Sum_{i=0}^{i=N} \{f\_i(p\_i-p\_0)*r(p\_i)\}/\Sum_{i=0}^{i=N}\{f\_i(p\_i-p\_0)\}$.
Where "\Sum" is a summation. The nearby point-wise samples of change rate are the (p_i) (as a function of position which may be obtained by geocoding the address to a latitude-longitude coordinate) that are combined to produce an estimate at the point. The functions f_i have their maxima at p_i and fall away as one moves away from that point. Consider 2 dimensional Gaussian "bumps" centered at each sample. If the change rate estimates are more certain for some points of the p_i, the functions f_i may be scaled appropriately to give greater influence to the point for which the change rate estimates are more certain.

The ancillary data may also include data that corresponds to an importance value associated with a location where an image provider acquires images. In some embodiments, the importance value may lie within a range between zero and ten. In this example, an importance value that lies within a range between seven and ten may correspond to a high user expectation that the image data collected from the location is current. Similarly, a low importance value that lies within a range between zero and three may correspond to a low user expectation that the image data collected from the location is not current.

As described in more detail below, the importance value may be based upon any number of factors any may be determined in several different ways. In some embodiments, the importance value may be determined based on a combination of different methods such that the importance value may be determined based on a weighted average or a mean value of the combination of importance values.

The ancillary data described above may be stored with its associated image or at a location, for example a database, separate from the image.

Server 110 may also access one or more observation bandwidth allocations 138. The image observation bandwidth may be defined as the total amount of resources expended gathering new images. The observation bandwidth allocations may identify a rate at which an image provider reacquires images from a specific location in order to maintain a store of current images that are likely to be retrieved by users.

For example, if there is a fleet of 10 vehicles available to take street level images, each vehicle may have some predefined unit of work, for example driving in a particular pattern of streets an collect images in some amount of time. Each vehicle's collection of images may be considered "an observation." After the observation is completed, the vehicle may return to a particular location to upload the collected images. In this example, the observation bandwidth may be measured in observations per unit of time. If a particular vehicle's unit of work takes 4 hours, the vehicle has taken 1 observation in 4 hours. The total bandwidth available (for all 10 of the vehicles) is fixed: 10 observations in 4 hours. The allocation consists of a set of tasking orders given to the fleet of vehicles, directing the fleet towards a next area(s) at which to collect new street level images.

In another example, a single satellite may gather some number of images per unit of time. The total images per time may be considered the observation bandwidth. This bandwidth may be allocated by pointing the satellite's imaging device at different locations that need to be observed (have images collected).

In addition to the operations described below and illustrated in the figures, various operations in accordance with aspects of the invention will now be described. It should also be understood that the following operations do not have to be performed in the precise order described below. Rather, various steps can be handled in a different order or simultaneously, and may include additional or fewer operations.

Figure 3:
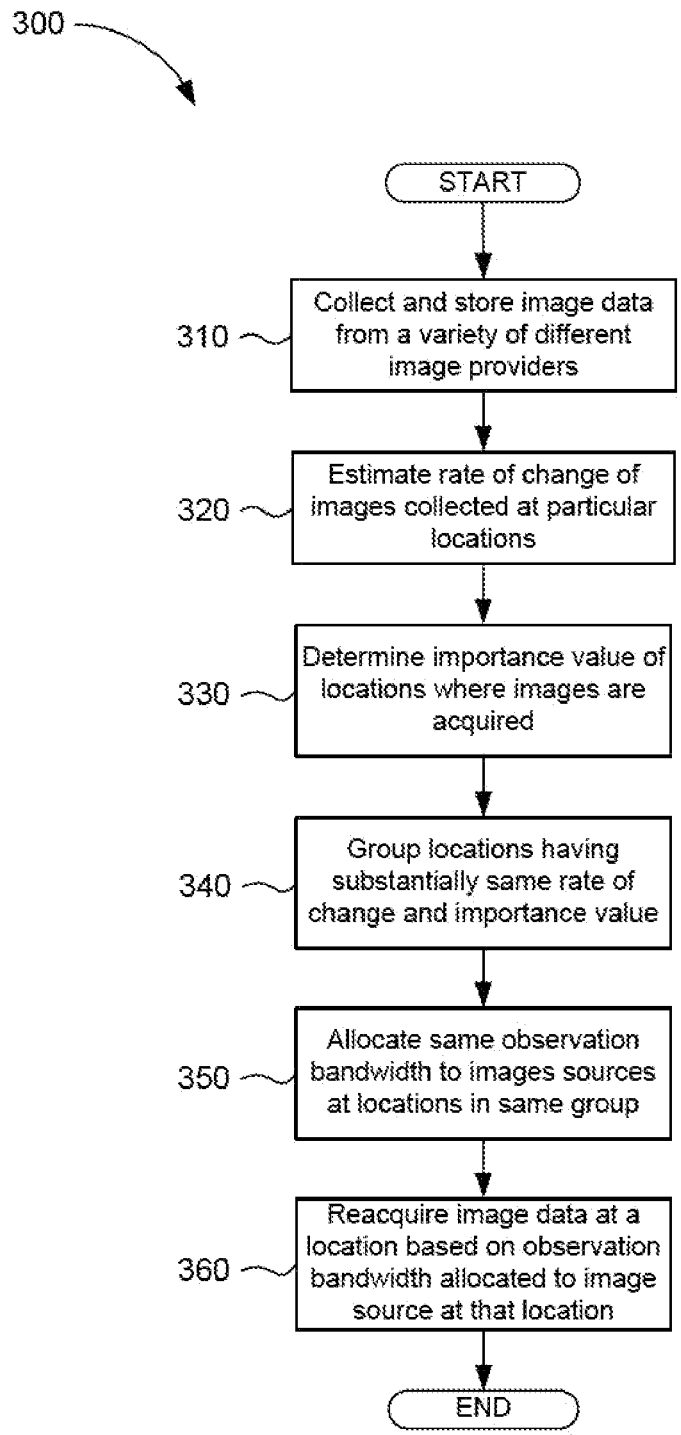
FIG. 3 is an exemplary flow diagram in accordance with aspects of the invention.

FIG. 3 demonstrates a process 300 of reacquiring image data. The process 300 begins when image data is collected by a server from a variety of different image providers and stored for subsequent user retrieval (step 310). The image data may be collected in a variety of different ways from different image providers. In one example, a vehicle equipped with a camera may drive around a city neighborhood and continuously collects image data using the camera. Accordingly, the collected images together may represent a multiple city blocks based on the route taken by the vehicle. In another example, an airplane or a satellite may capture images of the earth's surface from an aerial position using a camera to recreate a "bird's eye" view of the area using the captured images. In yet another example, the image data may be collected from a data store that acts as a repository for images that may be collected from a variety of different known means.

A rate of change of acquired images is estimated for particular locations (step 320). The rate of change may be identified based on the frequency that images from the same location become stale. Staleness may refer to image data that may have become outdated due to modifications made at the location that was previously captured in an image. In one example, the rate of change may be based upon consideration of point of interest density and churn. For example, how quickly businesses open, close, and are replaced may be used to estimate the rate of change for an imagery location. This may occur more often in some retail areas or where there are many tightly-spaced addresses. This point of interest density and churn may be determine based upon review of non-imagery sources, such as a white-pages type databases of business listings. In some examples, the rate of change may be based on identifying the changes in white-page listings over some period, for example two different years, and observing the geographic distribution of these changes. The greater the number of changes in a given area, the greater the likelihood that imagery is more likely to be out of date.

In another example, images of the same location taken at different times may be used to identify a rate of change. As new image data is acquired at a location to replace any stale image data, the newly acquired images may be provided in response to user requests rather than the stale images. The stale images may be retained in an image database. These saved images may be used to estimate the rate of change of the images captured at the location. Images that are spatially proximate are likely to become stale at substantially the same rate.

The rate of change of image data at a particular location may also be estimated based on user input. For example, a user may perform a search for a particular business by providing search criteria input to a search entity. In response to processing of the search criteria input, the user may be provided with directions and an image that shows a main entrance to the business. When the user arrives at the designated location, he may learn that the business does not exist at that location. In this case, the user may submit a report to the search entity that the image is not current. The user may further submit that the business has moved, that the address is incorrect, that the location is vacant or occupied by a different business, and/or that the business simply no longer exists. Accordingly, as images at the same location are reacquired, the rate at which such user reports are received may be used to estimate the rate of change of the location.

An importance value for a location is determined (step 330). As noted above, an importance value may be based upon various factors including the popularity of images acquired at a particular location, the likelihood that users are concerned with receiving current image data for the particular location, or an amount of user activity or a popularity value associated with the location.

The importance value may also be determined based upon the content of an image, etc. For example, for some locations, such as shopping areas, images with words may be considered more important than images without words, even if wordless images are accessed more frequently. In another example, for other locations, such as a database of different tree species, images including more trees may be of greater importance. In yet another example, images of objects matching a particular shape, for example, buildings with a particular geometry may be considered more important.

In another example, the importance value may be determined based on the user reports provided to the search entity identifying an image as stale or out of date. The fact that any user has chosen to submit such a report may be an indication of the importance and popularity of the location. Accordingly, the more user reports received for locations that are depicted in images, the more likely that those images may be considered important by different users. Thus, such a location may be provided with an importance value that reflects the popularity level of the images acquired at the location.

In another example, the importance value may be determined based on the popularity of a particular location as a navigation start point or end point. A tally may be maintained for the number of times that users seek directions from or to a particular location. The more times that directions are sought for that location, the more the corresponding importance value for the location may reflect its popularity.

In an additional example, an importance value may be determined using popularity-weighted spatial density of search entity advertiser revenues. A search entity commonly generates revenue from advertisers seeking to increase market share by drawing more customers to a physical location or to a website. Locations where the search entity's advertisers have a presence may be provided with a higher importance value than locations where no such advertisers are located. Since the search entity can easily determine its source of advertising revenue, the importance value can be easily determined for certain locations based on the density of advertisers in the same areas.

In a further example, an importance value may be determined using a number of electronic mobile devices that interact with the search entity at a particular location. The location of a mobile computing device may be tracked (e.g., via a user authorized application or system) such that a user's current location may be reported from any area. For example, a user may use the device to identify points of interest located near the user's current location, or to "check-in" to an establishment at the current location. Accordingly, the importance value of a location may be determined based on the number of different mobile computing devices that use, as a current location, a location that corresponds to an area where images are acquired. In one illustrative example, a public square in the center of a town is more likely to be a current location for a mobile computing device than a suburban residential area located on the outskirts of the town.

As demonstrated by the examples above, the importance value may be a relative determination based upon the circumstances of the images themselves as well as the particular image providers.

Different locations having substantially the same identified rate of change and determined importance value are grouped together (step 340). For example, the rate of change may be determined based on a number of times per year that an image associated with a location changes. In addition, for each image provider the importance value for a location may lie within a range between one and ten. In this example, locations that have substantially the same rate of change may be identified as changing: 1) between zero and one time per year, 2) between one and two times per year, 3) between two and three times per year, 4) between three and four times per year, 5) between four and five times per year, 6) between five and six times per year, and 7) greater than six times per year. Similarly, locations that have substantially the same importance value may be identified as locations having an importance value between: 1) zero and one, 2) one and two, 2) two and three, 3) three and four, 4) four and five, 5) five and six, 6) six and seven, 7) seven and eight, 8) eight and nine, and 9) nine and ten.

In some examples if images of a location are being acquired from a third party, rather than by sending a camera to collect an image, the image provider themselves, rather than simply the locations of the images, may be grouped together. For example, if images are discovered through a web crawl, the web pages may be grouped together, again according to rate of change and importance.

Since any given image provider may be unlikely to constantly acquire the same types of images from locations having the same general characteristics, a particular image provider may be associated with different locations each having different rates of change and importance values. For example, some imagery types, such as aerial or satellite imagery, may be collected in large "bundles" as a broad area may be photographed in a single pass (or observation). In one illustrative example, the data source may be a camera attached to a helicopter that is capturing images from an aerial position above a large city on one particular day. On a different day, the same image provider associated with the same helicopter may be collecting aerial images over a desert region. Accordingly, each image provider may acquire images from locations having different rates of change and importance values.

The same observation bandwidth is allocated to the image providers at locations that have been grouped together to optimize the utility of the observations (step 350). The observation bandwidth allocated to an image provider may change depending on the location of the image provider such that the image provider reacquires new images at different rates depending on the location where the image provider is operating. Providers or locations within a grouping receive equal treatment. However, in some examples, some groupings may be provided with a significant portion of the allocated observation bandwidth while other groupings may be completely ignored.

Using the example discussed above, the camera operating in the urban area may be allocated more observation bandwidth than the same camera operating in the desert region. Accordingly, the observation bandwidth allocation may be optimized such that each image provider is scheduled to reacquire images from a specific location according to when the images obtained at that location are likely to be stale and whether users are likely to be requesting current images at that location. For example, returning to the example, of the fleet of vehicles, the vehicles may be instructed to drive and spend more time collecting images in urban areas (with a greater rate of change and importance) than in desert areas (which may have a lower rate of change and importance).

Image data is reacquired at a location based on the observation bandwidth allocated to the image provider at that location (step 360). In accordance with some embodiments, the observation bandwidth allocated to an image provider may increase the likelihood that the image provider collects new image data that is also frequently requested by users. However, in some cases, the image provider may reacquire image data that does not include anything new and/or any newly acquired images may not often be requested by users.

Figure 4:
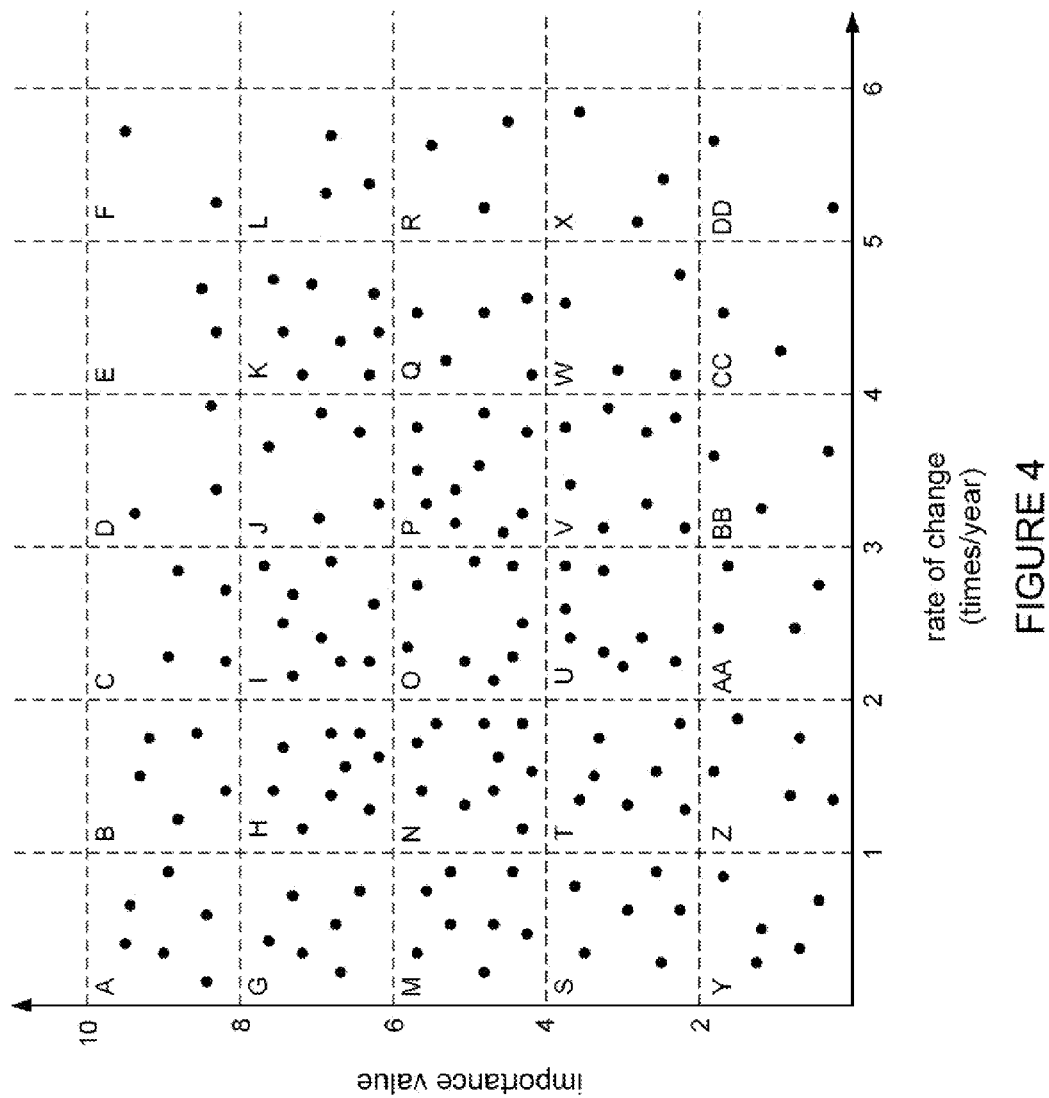
FIG. 4 is an exemplary graph that illustrates the relationship between a rate of change and importance value for image providers in accordance with aspects of the invention.

FIG. 4 is an exemplary graph in accordance with aspects of the invention that illustrates the relationship between a rate of change and importance values for locations where image providers acquire images. The graph plots importance values against values corresponding to a rate of change for specific locations. As shown in the figure, the importance value may lie within an exemplary range between zero and ten where a zero value identifies the corresponding location as not at all important and a value of ten identifies the corresponding location as of utmost importance. Similarly, the rate of change may be described based on a number of times per year. As shown in the figure, the rate of change value may lie within an exemplary range between zero and six times per year. Other ranges may be used for the importance and rate of change values and still lie within the scope of the invention as recited in the appended claims.

For each image provider at a particular location, values may be determined for the rate of change and importance. These values may then be used to allocate observation bandwidth to the image provider at the location and to other image providers at similar locations. Referring to the figure, seven different locations have a rate of change between once and twice per year and an importance value between two and four (see box "T"). Accordingly, the image providers at these locations are allocated the same observation bandwidth. Similarly, eight different locations have a rate of change between four and five times per year and an importance value between six and eight (see box "K"). Accordingly, the image providers at these five locations are allocated the same observation bandwidth.

The amount of observation bandwidth allocated may take into account both values for rate of change and importance. In some examples, the observation bandwidth allocation may be based upon the corresponding rate of change value. In some embodiments, the rate of change value may be increased for a corresponding high importance value (e.g., an importance value between seven and ten), decreased for a corresponding low importance value (e.g., an importance value between zero and three), or is not changed for a corresponding mid-level importance value (e.g., an importance value between three and seven).

Referring to box "B" in the figure, there are five locations that have a rate of change between once and twice per year and an importance value between eight and ten. Since the importance value for these locations is relatively high, the observation bandwidth allocated to the corresponding image providers at these locations will be higher than the rate of change of the corresponding locations. In one illustrative example, the allocated observation bandwidth for the corresponding image providers may be three times per year or once every four months.

Referring to box "CC" in the figure, there are two locations that have a rate of change between four and six times per year and an importance value between zero and two. Since the importance value for these locations is relatively low, the observation bandwidth allocated to the corresponding image providers may be lower than the rate of change of the corresponding locations. In one illustrative example, the allocated observation bandwidth for the corresponding image providers may be twice a year or once every six months.

Referring to box "P" in the figure, there are ten locations that have a rate of change between three and four times per year and an importance value between four and six. Since the importance value for these locations is not considered to be particularly high or low, the observation bandwidth allocated to the image providers at these locations may remain substantially the same as the rate of change of the corresponding locations. In one illustrative example, the allocated observation bandwidth for the corresponding image providers may be four times a year or once every three months.

Once the observation bandwidth is allocated for the image providers, the image providers may continue to capture images as previously performed. However, the rate at which the images are reacquired may be higher or lower. Based on the observation bandwidth allocations, an image provider may be more likely to capture current images to replace corresponding stale images where such images are commonly requested by users. Similarly, an image provider may be less likely to capture images that have not been modified since the subsequent image acquisition. An image provider may also be less likely to capture images that have been modified since the subsequent image acquisition where such images are not often requested by users.

As described above, observation bandwidth is allocated to an image provider such that an image may be reacquired while optimizing the utility of the image provider's observations. The observation bandwidth of an image provider is allocated with reference to the rate of change associated with a location, where the images are acquired by the image provider, and to an importance value associated with the location. The rate of change identifies how frequently the location is subject to modifications. The importance value indicates the likelihood that users are concerned with receiving current image data from the location. The different locations having substantially the same rate of change and importance value are grouped together. The same observation bandwidth is allocated for the image providers at locations that are grouped together to optimize the utility of the observations. Images may then be reacquired using the observation bandwidth allocated to the images sources.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A system comprising one or more processors configured to:
    estimate a rate of change for a geographic location using image data of the geographic location, wherein the rate of change identifies a frequency at which the geographic location is modified;
    determine an importance value for the geographic location that indicates an likelihood that the image data of the geographic location is current;
    determine observation bandwidth for one or more image providers at the geographic location based on the estimated rate of change and the determined importance value, wherein the observation bandwidth identifies a rate at which the image provider reacquires image data at the geographic location; and
    allocate the determined observation bandwidth by:
        grouping a plurality of geographic locations that have substantially the same estimated rate of change and substantially the same determined importance value;
        accessing a plurality of image providers each image provider of the plurality of image providers associated with at least one geographic location; and
        determining the same observation bandwidth for each image provider associated with geographic locations in the same group.

2. The system of claim 1, wherein the one or more processors are further configured to reacquire the image data at the geographic location based on the observation bandwidth for one of the plurality of image providers at the location.

3. The system of claim 1, wherein the one or more processors are further configured to determine the observation bandwidth by, in the event that the importance value indicates an expectation that the image data of the geographic location is current, determining the observation bandwidth for the one or more image providers at the location that is higher than the corresponding rate of change of the geographic location.

4. The system of claim 1, wherein the one or more processors are further configured to determine the observation bandwidth by, in the event that the importance value indicates no expectation that the image data of the location is current, determining the observation bandwidth for the one or more image providers at the geographic location that is lower than the corresponding rate of change of the geographic location.

5. The system of claim 1, wherein the one or more processors are further configured to determine the importance value by:
    receiving input from users regarding a modification to the geographic location; and
    identifying a number of users from which the input is received.

6. The system of claim 1, wherein the one or more processors are further configured to determine the importance value by identifying a number of times that the geographic location is received as a navigational point.

7. The system of claim 1, wherein the one or more processors are further configured to determine the importance value by identifying a number of advertisers associated with the geographic location.

8. The system of claim 1, wherein an image provider of the one or more image providers is associated with a search entity, and the one or more processors are further configured to determine the importance value by identifying a number of users that interact with the search entity at the geographic location.

9. The system of claim 1, wherein the one or more processors are further configured to determine the importance value by:
    identifying a combination of importance values associated with the location; and
    determining the importance value based on the identified combination.

10. A system comprising one or more processors configured to:
    for each geographic location of a plurality of geographic locations:
        (1) identify a rate of change for the geographic location using images of the plurality of geographic locations, wherein the rate of change identifies a frequency at which the location is modified; and
        (2) determine an importance value associated with the geographic location, wherein the importance value indicates a likelihood that the image data of the geographic location is current;
    group one or more sets of geographic locations of the plurality of geographic locations that have substantially the same identified rate of change and substantially the same determined importance value, wherein the one or more sets of geographic locations of the plurality of geographic location are grouped using the processor;
    allocate a same observation bandwidth to one or more image providers associated with geographic locations in the same set, wherein the observation bandwidth is allocated using the processor; and
    reacquire images using the one or more image providers at a rate identified by the corresponding allocated observation bandwidth.

11. The system of claim 10, wherein the one or more processors are further configured to identify the rate of change by:
    accessing images previously collected at the geographic location; and
    identifying a frequency with which the accessed images change.

12. The system of claim 10, wherein the one or more processors are further configured to identify the rates of change by:
  receiving input regarding a modification to the geographic location; and
  identifying a frequency with which the input is received.

13. The system of claim 10, wherein the one or more processors are further configured to identify the rates of change by:
  receiving input from users regarding a modification to the geographic location; and
  identifying a number of users from which the input is received.

14. The system of claim 10, wherein the one or more processors are further configured to determine the importance values by identifying a number of times that each of the plurality of the geographic locations is received as a navigational point.

15. The system of claim 10, wherein the one or more processors are further configured to determine the importance values by identifying a number of advertisers associated with the geographic location for that particular importance value.

16. The system of claim 10, wherein each of the one or more image providers is associated with a search entity, and the one or more processors are further configured to determine the importance values by identifying a number of users that interact with the search entity at the location.

17. The system of claim 10, wherein the one or more processors are further configured to determine the importance values further based on whether an image of the geographic location for that particular importance value includes text information.

18. A method comprising:
  determining, by one or more processors, observation bandwidth for one or more image providers at a geographic location based on an estimated rate of change for the geographic location and an importance value that indicates an likelihood that the image data of the geographic location is current, and wherein the observation bandwidth identifies a rate at which the image provider reacquires image data at the geographic location and the rate of change identifies a frequency at which the geographic location is modified; and
  allocating, by the one or more processors, the determined observation bandwidth by:
    grouping a plurality of geographic locations that have substantially a same rate of change as the geographic location and substantially a same importance value as the geographic location; and
    determining observation bandwidth for one or more image provider associated with geographic locations in the same group.

19. The method of claim 18, further comprising estimating the rate of change for the geographic location further by:
  accessing image data previously collected at the geographic location; and
  identifying a frequency with which the accessed image data changes.

20. The method of claim 18, further comprising estimating the rate of change for the geographic location further by:
  receiving input regarding a modification to the geographic location; and
  identifying a frequency with which the input is received.

* * * * *